United States Patent
Park et al.

(10) Patent No.: US 9,197,883 B2
(45) Date of Patent: Nov. 24, 2015

(54) DISPLAY APPARATUS AND CONTROL METHOD THEREOF

(71) Applicant: SAMSUNG ELECTRONICS CO., LTD., Suwon-si (KR)

(72) Inventors: Jae-sung Park, Anyang-si (KR); Min-cheol Hwang, Seoul (KR); Jun-ho Sung, Seoul (KR); Sang-un Yun, Seoul (KR); Bong-hwan Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 348 days.

(21) Appl. No.: 13/731,868

(22) Filed: Dec. 31, 2012

(65) Prior Publication Data

US 2013/0169768 A1 Jul. 4, 2013

(30) Foreign Application Priority Data

Jan. 2, 2012 (KR) .................. 10-2012-0000294

(51) Int. Cl.
*H04N 13/04* (2006.01)
*H04N 9/47* (2006.01)
*H04N 13/00* (2006.01)

(52) U.S. Cl.
CPC ....... *H04N 13/0438* (2013.01); *H04N 13/0018* (2013.01); *H04N 13/0033* (2013.01); *H04N 13/04* (2013.01); *H04N 13/0434* (2013.01); *H04N 13/0497* (2013.01)

(58) Field of Classification Search
None
See application file for complete search history.

(56) References Cited

U.S. PATENT DOCUMENTS

| | | | | |
|---|---|---|---|---|
| 6,747,610 | B1 * | 6/2004 | Taima et al. | 345/6 |
| 8,767,051 | B2 * | 7/2014 | Yoon et al. | 348/51 |
| 8,810,630 | B2 * | 8/2014 | Kim et al. | 348/43 |
| 2009/0051759 | A1 * | 2/2009 | Adkins et al. | 348/53 |
| 2010/0188382 | A1 * | 7/2010 | Chen et al. | 345/211 |
| 2011/0018976 | A1 * | 1/2011 | Park | 348/51 |
| 2011/0032340 | A1 * | 2/2011 | Redmann et al. | 348/51 |
| 2011/0090321 | A1 * | 4/2011 | Nakagawa et al. | 348/51 |

(Continued)

FOREIGN PATENT DOCUMENTS

GB 2480363 A 11/2011
WO 2011086593 A1 7/2011

OTHER PUBLICATIONS

Communication dated Jul. 30, 2015 issued by European Patent Office in counterpart European Patent Application No. 12199745.6.

*Primary Examiner* — Joseph Ustaris
*Assistant Examiner* — Talha Nawaz
(74) *Attorney, Agent, or Firm* — Sughrue Mion, PLLC

(57) ABSTRACT

A display apparatus is provided, which may includes an image receiver which receives an image, an image processor which separates the received image into a left-eye image and a right-eye image and process the left-eye and right-eye images, an image output unit including a display panel which displays the left-eye and right-eye images alternately, a storage which stores a response speed of the display panel, and a controller which calculates a pixel value difference between the left-eye and right-eye images based on a unit of pixels that constitute the left-eye and right-eye images, detects a crosstalk generating area of the left-eye and right-eye images using the calculated pixel value difference and the response speed of the display panel stored in the storage, and controls so that the detected crosstalk generating area is indicated distinguishably from other areas of the left-eye and right-eye images.

12 Claims, 12 Drawing Sheets

(56) References Cited

U.S. PATENT DOCUMENTS

| | | |
|---|---|---|
| 2011/0169871 A1* | 7/2011 | Suzuki et al. ............... 345/690 |
| 2011/0210965 A1* | 9/2011 | Thorpe ....................... 345/419 |
| 2011/0211042 A1* | 9/2011 | Thorpe et al. ................ 348/43 |
| 2011/0261029 A1 | 10/2011 | Moon et al. |
| 2011/0267494 A1* | 11/2011 | Ogawa ..................... 348/223.1 |
| 2011/0310096 A1* | 12/2011 | Kim et al. .................. 345/419 |
| 2012/0013601 A1* | 1/2012 | Park et al. .................. 345/419 |
| 2012/0050263 A1* | 3/2012 | Kang ......................... 345/419 |
| 2012/0057780 A1* | 3/2012 | Matsumoto ................. 382/154 |
| 2012/0120050 A1* | 5/2012 | Hemminki .................. 345/419 |
| 2012/0162219 A1* | 6/2012 | Kobayashi et al. .......... 345/419 |
| 2012/0169790 A1* | 7/2012 | Broughton et al. .......... 345/690 |
| 2012/0274749 A1 | 11/2012 | Nakayama et al. |
| 2012/0320056 A1* | 12/2012 | Ahn et al. ................... 345/426 |

* cited by examiner

FIG. 4

| Example | 64 | 200 | 255 |
|---|---|---|---|
| 64 | - | 3.7 ms | 3.4 ms |
| 200 | 4.6 ms | - | 6.2 ms |
| 255 | 8.1 ms | 8.9 ms | - |

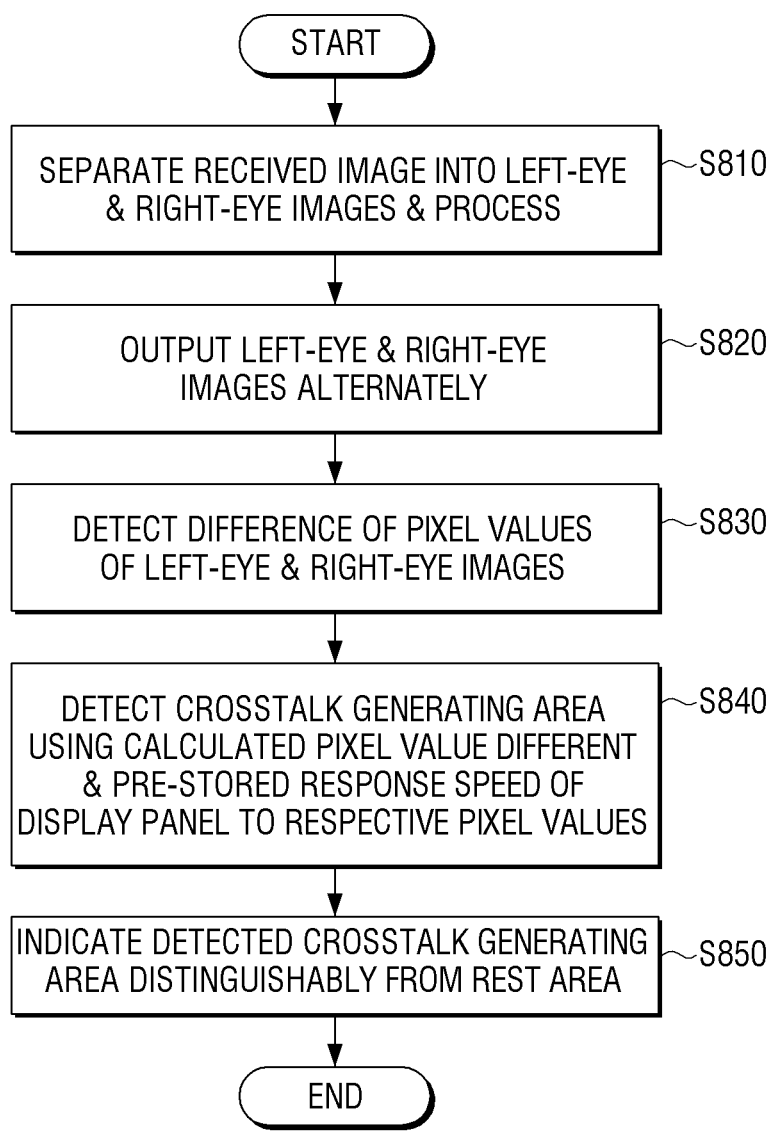

DISPLAY APPARATUS AND CONTROL METHOD THEREOF

CROSS-REFERENCE TO RELATED APPLICATIONS

This application claims priority from Korean Patent Application No. 10-2012-000294, filed on Jan. 2, 2012 in the Korean Intellectual Property Office, the disclosure of which is incorporated herein by reference in its entirety.

BACKGROUND

1. Field

Apparatuses and methods consistent with the disclosure provided herein relate to displaying, and more specifically, to a display apparatus for displaying three-dimensional image and a control method thereof.

2. Description of the Related Art

Three-dimensional (3D) image technology is considered to be the core base technology of the next-generation 3D image multimedia information communication, as this is applicable in a variety of areas such as information communication, broadcasting, medicine, education, training, the military, computer games, animation, virtual reality, computer-aided design (CAD), industrial technology, etc., and commonly required in these areas.

The illusion of depth is perceived by human based on a combination of variation of thickness of eye lens according to location of an object observed, difference of angles between both eyes and the object, difference of location and shape of the object as perceived at both eyes, disparity generated in accordance with the movement of the object, and other mental effects and memories.

Among these, the 'binocular disparity', which is generated due to location of human's two eyes at a distance of approximately 6 cm to 7 cm in horizontal direction, works as the most important element that contributes to the illusion of depth. The binocular disparity causes the human to view an object with differences of angles, which cause two different images to enter the respective eyes, so that the two images are transmitted to the brain where the two pieces of information are precisely fused with each other to provide the feeling of 3D image.

A 3D image display may generally categorized as a glass type which employs special-purpose glasses, and a non-glass type which does not employ the glasses. The glass type may be categorized into color filter type which separates and selects images using color filters complement to each other, polarizing filter type which separates left-eye and right-eye images using light shading effect by the combination of polarizing devices orthogonal to each other, and shutter glass type which provides feeling of depth by alternately shielding left and right eyes in accordance with the synchronous signal which projects left-eye and right-eye image signals onto a screen.

A related art display has frequent crosstalk in displaying left-eye and right-eye images due to response speed of a display panel. That is, the crosstalks increase as the gradation of left-eye and right-eye images increases.

However, since an area having crosstalk is not indicated, it is difficult to solve the defects in making or editing contents particularly in the monitoring process for broadcasting.

SUMMARY

Exemplary embodiments overcome the above disadvantages and other disadvantages not described above. Also, the exemplary embodiments are not required to overcome the disadvantages described above, and an exemplary embodiment of the present inventive concept may not overcome any of the problems described above.

One or more embodiments provide a display apparatus which detects an area having crosstalk and displays the detected area distinguishably from other areas and a control method thereof.

According to an aspect of an exemplary embodiment, there is provided a display apparatus may include an image receiver which receives an image, an image processor which separates the received image into a left-eye image and a right-eye image and process the left-eye and right-eye images, an image output unit including a display panel which displays the left-eye and right-eye images alternately, a storage which stores a response speed of the display panel, and a controller which calculates a pixel value difference between the left-eye and right-eye images based on a unit of pixels that constitute the left-eye and right-eye images, detects a crosstalk generating area of the left-eye and right-eye images using the calculated pixel value difference and the response speed of the display panel stored in the storage, and controls so that the detected crosstalk generating area is indicated distinguishably from other areas of the left-eye and right-eye images.

The controller may control so that the crosstalk generating area is displayed in different forms depending on the degrees of crosstalk as generated.

The controller may determine an area possibly having crosstalk based on an area in which the calculated pixel value difference with respect to respective pixel unit of the left-eye and right-eye images is greater than a reference value, and check the response speed of the display panel according to variation of pixel values of the left-eye and right-eye images with respect to the area determined to possibly have the crosstalk and detect the crosstalk generating area.

The display apparatus may additionally include a user interface unit which receives the reference value to determine the area possibly having crosstalk.

The controller may control so that the area possibly having crosstalk is distinguishably indicated from the other areas.

The storage may store the response speed of the display panel according to the variation in pixel value.

The controller may provide a 3D option setup guideline to minimize crosstalk effect at the detected crosstalk generating area.

The 3D option setup guideline may be a setup guideline regarding 3D option according to at least one of a display apparatus manufacturer and a product model.

According to an aspect of another exemplary embodiment, there is provided a control method of a display apparatus is provided, which may include separating a received image into a left-eye image and a right-eye image and processing the left-eye and right-eye images, displaying the left-eye and right-eye images alternately, calculating a pixel value difference of the left-eye and right-eye images based on a unit of pixels constituting the left-eye and right-eye images, detecting a crosstalk generating area of the left-eye and right-eye images using the calculated pixel value difference and prestored response speed of a display panel, and displaying the detected crosstalk generating area distinguishably from other areas of the left-eye and right-eye images.

The displaying may include displaying the crosstalk generating area in different forms according to degrees of crosstalk as generated.

The detecting the crosstalk generating area may include determining an area possibly having crosstalk based on an area in which the calculated pixel value difference with respect to respective pixel unit of the left-eye and right-eye images is greater than a reference value, and checking the response speed of the display panel according to variation of pixel values of the left-eye and right-eye images with respect to the area determined to possibly have the crosstalk and detecting the crosstalk generating area.

The control method may additionally include inputting the reference value to determine the area possibly having crosstalk.

The control method may additionally include indicating the area possibly having crosstalk distinguishably from the other areas.

The pre-stored response speed of the display panel may be the display response speed corresponding to the variation in pixel value.

The control method may additionally include providing a 3D option setup guideline to minimize crosstalk effect at the detected crosstalk generating area.

The 3D option setup guideline may be a setup guideline regarding 3D option according to at least one of a display apparatus manufacturer and a product model.

BRIEF DESCRIPTION OF THE DRAWINGS

The above and/or other aspects will be more apparent by describing certain exemplary embodiments with reference to the accompanying drawings, in which:

FIG. 4 is a view provided to explain form of table which stores response speed of a panel according to an exemplary embodiment;

FIG. 8 is a flowchart provided to explain a control method of a display apparatus according to an exemplary embodiment.

DETAILED DESCRIPTION OF EXEMPLARY EMBODIMENTS

Figure 1:
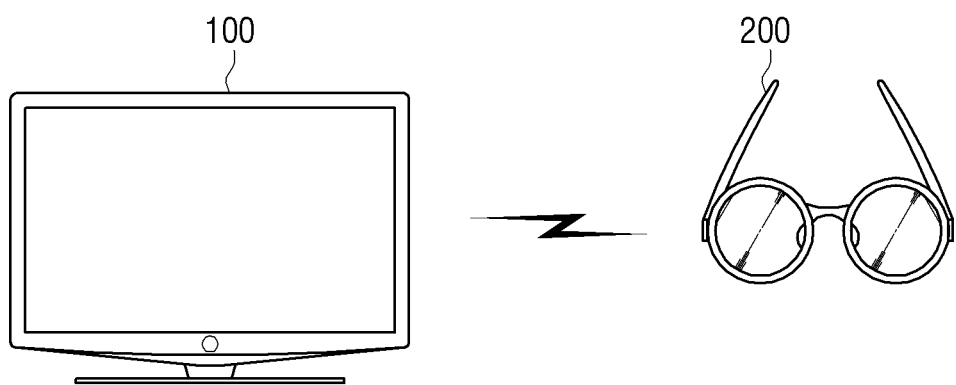
FIG. 1 illustrates a 3D image providing system according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

FIG. 1 illustrates a system for providing 3D image according to an exemplary embodiment. Referring to FIG. 1, the 3D image providing system may include a display apparatus 100 which displays 3D image on a screen, and 3D glasses 200 worn by a user to watch the 3D image displayed on the screen.

The display apparatus 100 may receive a 2D image or a 3D image. For example, the 2D image may be received from a photographing device including camera or an image storage device, or may receive a 3D image captured through camera, edited/processed at a broadcasting station and transmitted from the broadcasting station. The display apparatus 100 processes the received image and displays the resultant image on the screen. To be specific, the display apparatus 100 may process the left-eye and right-eye images by referring to the 3D image format so that the processed left-eye and right-eye images are time-divided and displayed alternately.

The 3D glasses 200 may be implemented as active type, which may be the shutter glasses to synchronize with the display time point of left-eye and right-eye images displayed on the display apparatus 100 and turn on/off the left-eye and right-eye shutters. However, an embodiment is not limited to the specific example provided above. Accordingly, the 3D glasses 200 may be implemented in other forms such as passive type polarization glasses in which left and right eyes have different polarizations from each other.

The image providing system according to an exemplary embodiment may additionally include a camera (not illustrated) to generate 3D image.

The camera (not illustrated) may generate a left-eye image captured to be provided to a left eye of the viewer, and a right-eye image captured to be provided to a right eye of the viewer. That is, the 3D image includes left-eye and right-eye images, which are alternately provided to left and right eyes of the viewer to generate a feeling of depth by binocular disparity.

Accordingly, the camera (not illustrated) may include a left-eye camera to generate a left-eye image and a right-eye camera to generate a right-eye image, at distance from each other in consideration of the distance between two eyes of the viewer.

The camera (not illustrated) may transfer the captured left-eye and right-eye images to the display apparatus 100. To be specific, the left-eye and right-eye images transferred from the camera (not illustrated) to the display apparatus 100 may be in such a format in which a frame contains purely either one of the left-eye and right-eye images, or contains both the left-eye and right-eye images.

The camera (not illustrated) may determine one of various 3D image formats in advance and generate the 3D image based on the determined format and accordingly transfer the generated 3D image to the display apparatus 100.

Figure 2:
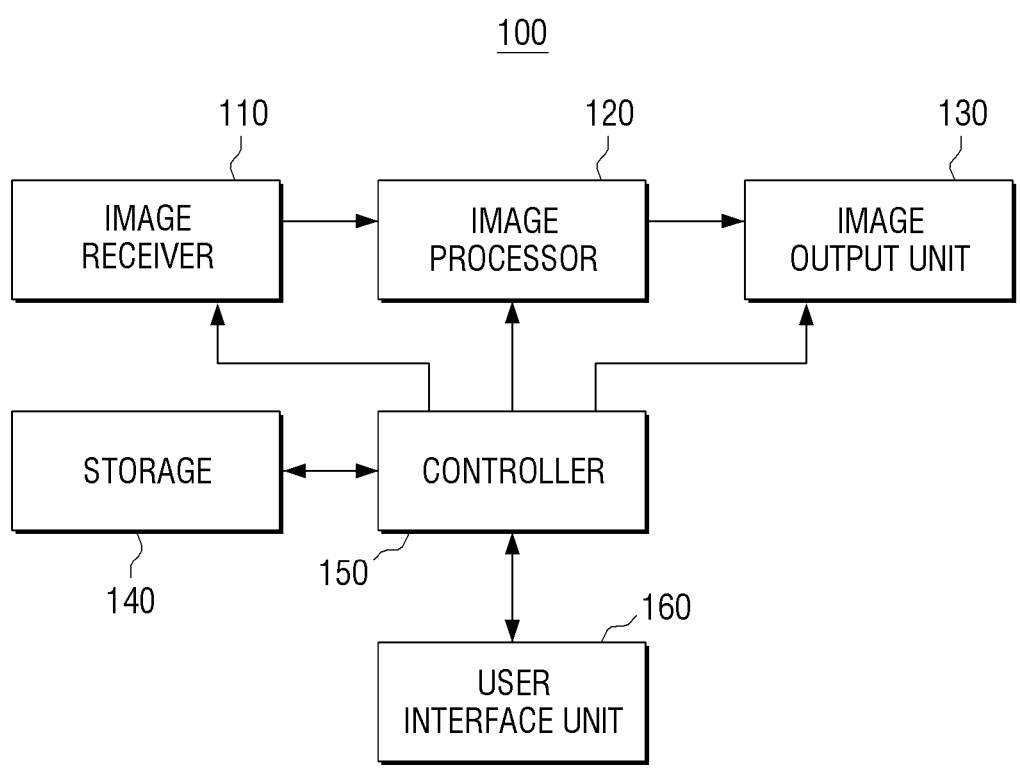
FIG. 2 is a block diagram of the display apparatus 100 of FIG. 1 according to an exemplary embodiment.

FIG. 2 is a block diagram of the display apparatus 100 of FIG. 1 according to an exemplary embodiment.

Referring to FIG. 2, the display apparatus 100 may include an image receiver 110, an image processor 120, an image output unit 130, a storage 140, a controller 150, and a user interface unit 160.

The image receiver 110 may receive a broadcast which may be received from broadcasting station or satellite by wired or wireless manner, and demodulates the received broadcast. Further, the image receiver 110 may be connected to an external device such as a camera to receive a 2D or 3D image from the connected external device. The camera may be connected to the external device wirelessly, or by wired manner through use of interface such as S-Video, component, composite, D-Sub, DVI, or HDMI.

The 3D image includes at least one frame, each of which may contain either left-eye image or right-eye image, or alternatively, contain both the left-eye and right-eye images. That is, the 3D image is generated according to one of various 3D formats.

Accordingly, the image receiver 110 may receive 3D images of various formats, which may include, for example, a top-bottom format, a side-by-side format, a horizontal interleaving format, a vertical interleaving format or a checker board format, or a sequential frame format.

The image receiver 110 may transfer the received 2D or 3D image to the image processor 120.

The image processor 120 may perform signal processing including video decoding, format analysis, or video scaling, and other operations including GUI addition.

The image processor 120 may generate left-eye and right-eye images corresponding to the size of a screen (e.g., 1920*1080) using the format of the image input to the image receiver 110.

By way of example, if the 3D image received via the image receiver 110 is top-bottom, side-by-side, horizontal interleaving, vertical interleaving or checker board, or sequential frame format, the image processor 120 may extract left-eye and right-eye portions from the respective image frames, and up-scale or interpolate the extracted left-eye and right-eye images to provide to the viewer.

The information regarding the input 3D image format may or may not be included in the 3D image signal.

By way of example, if the information regarding the input 3D image format is included in the 3D image signal, the image processor 120 may analyze the 3D image and extract the information regarding the format, and process the received 3D image according to the extracted image. On the contrary, if the 3D image signal does not contain information about the format of the input 3D image, the image processor 120 may process the received 3D image according to a format as input by the user, or according to a preset format.

Further, if a 2D image is received via the image receiver 110, the image processor 120 may convert the received image into a 3D image, and separate the converted 3D image into left-eye and right-eye images for processing.

The image processor 120 may time-divide the extracted left-eye and right-eye images and transfer the images to the image output unit 130 alternately. That is, the image processor 120 may transfer the left-eye and right-eye images to the image output unit 130 in time order of: left-eye image (L1)→right-eye image (R1)→left-eye image (L2)→right-eye image (R2)→ and so on.

The image output unit 130 may alternately output the left-eye and right-eye images as output from the image processor 120 to provide the same to the viewer.

Figure 3:
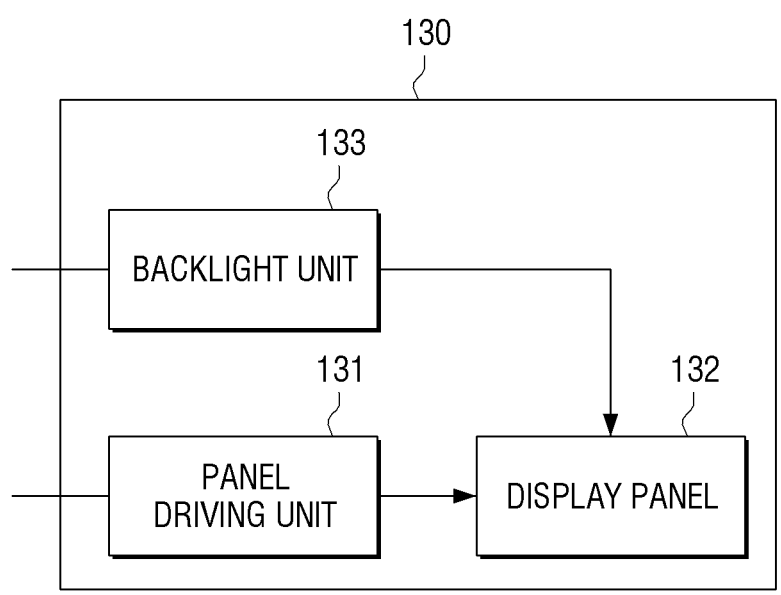
FIG. 3 is a detailed block diagram of an image output unit 130 according to an exemplary embodiment.

FIG. 3 is a detailed block diagram of the image output unit 130 according to an exemplary embodiment.

Referring to FIG. 3, the image output unit 130 may include a panel driving unit 131, a display panel 132 and a backlight unit 133.

The display panel 132 operates to display the left-eye and right-eye images, and may be implemented as, for example, a liquid crystal display (LCD) panel, an organic light emitting diode (OLED) panel, or a plasma display panel (PDP).

The display panel 132 may be implemented to include red, green and blue (RGB) pixels, in which each of the RGB pixels may illuminate concurrently or sequentially according to control of the controller 150.

The panel driving unit 131 operates to drive the display unit 132 according to the control of the controller 150.

The backlight unit 133 may include a backlight illuminating unit (not illustrated) which may emit light onto the display panel 132, and a backlight driving unit (not illustrated) which may drive the backlight illuminating unit (not illustrated).

The backlight unit 133 may be provided when the display panel 132 requires a separate backlight light source such as an LCD panel, and may not be implemented for a panel such as an OLED panel which includes self-illuminating device.

The backlight driving unit (not illustrated) may have a plurality of scanning pulses that construct one frame cycle, and generate a scanning signal regulated according to the control of the controller 150 to drive the backlight illuminating unit (not illustrated).

The backlight illuminating unit (not illustrated) may emit light onto the display panel 132, and may use one of white light emitting diodes (LEDs) or color OLEDs as a light source. However, the above-mentioned example is not limiting. That is, the backlight illuminating unit (not illustrated) may be implemented in other forms, for example, as one of a CCFL (Cold Cathode Fluorescent Lamp), an HCFL (Hot Cathode Fluorescent Lamp), an HCFL (Hot Cathode Fluorescent Lamp), an SED (Surface-conduction Electron-emitter Display), or an FED (Field Emission Display).

Further, the backlight illuminating unit (not illustrated) may be divided into a predetermined number of areas and scan-driven by the backlight driving unit (not illustrated). The predetermined number of areas may be according to a line unit, or a block unit. As used herein, the block may be a predetermined number of lamps, in which case the backlight driving unit (not illustrated) may be constructed to turn on and off in block-wise manner.

In the above example, the controller 150 may control the backlight driving unit (not illustrated) to drive the backlight illuminating unit (not illustrated) at a predetermined time point at which the left-eye and right-eye images are displayed.

The storage 140 is a recording medium recording therein various programs necessary for operating the display apparatus 100 and may be implemented as a memory, or an HDD (hard disk drive).

To be specific, the storage 140 may store response speed of the display panel 132 in table form. That is, the storage 140 may store the response speed of the display panel 132 in accordance with the change in pixel values.

By way of example, the storage 140 may store the response speed of the display panel 132 in the form of gray-to-gray response time (G-G RT) table. The table may be prepared by measuring the response speed of the panel or obtained from the panel manufacturer.

The controller 150 may control the overall operation of the display apparatus 100 according to the user command transferred from the user interface unit 160 which will be explained in detail below.

To be specific, the controller 150 may control the image receiver 110 and the image processor 120 to separate the received 2D or 3D image into left-eye and right-eye images, and scale or interpolate the separated left-eye and right-eye images to a size suitable for displaying on one screen.

The controller 150 may calculate difference of pixel values with respect to respective pixel units of the left-eye and right-eye images, and detect the area having crosstalk using the calculated differences of the pixel values and the response speed of the display panel as stored at the storage 140.

The controller 150 may determine the area possibly having crosstalk with reference to the calculated differences of the pixel values, and detect the crosstalk generating area by checking response speed in accordance with the variation of the pixel values of the left-eye and right-eye images with respect to the area determined to possibly have crosstalk.

The difference of the pixel values may be calculated by the following equation:

$$Res[i][j]=LImage[i][j]-RImage[i][j]$$

where i, j denote pixel coordinates of incoming image.

In one exemplary embodiment, the controller 150 may control so that the crosstalk generating area is distinguishably displayed from the other areas.

Further, the controller 150 may control the crosstalk generating area to be in different forms according to the degree of crosstalk as generated. By way of example, the crosstalk generating area may be indicated by a different color, or overlaid on the screen by grayscale. In the above example, the area having larger variation in grayscale in the above-mentioned G-G RT table may be indicated in deeper color.

Further, depending on occasions, the controller 150 may indicate the area possibly having crosstalk in different forms according to the difference of the pixel values.

The user interface unit 160 may transfer a user command received from the input means such as remote controller to the controller 150.

To be specific, the user interface unit 160 may receive a reference value to determine the area possibly having crosstalk.

In one exemplary embodiment, if the calculated pixel value is larger than the reference value input through the user interface unit 160, the controller 150 may detect the corresponding area as the area possibly having crosstalk. However, other embodiments are possible. Further, the reference value for determining area possibly having crosstalk may be set as default.

In one exemplary embodiment, if the crosstalk generating area is detected, a 3D option setup guideline may be provided to minimize the crosstalk effect at the detected crosstalk generating area. The 3D option may include a CTR option, a glass duty operation related option, or the like.

That is, if crosstalk generating area regarding corresponding content is detected through the display apparatus 100, the 3D option setup guideline may be added to the content provided to the viewer, to minimize the crosstalk effect at the detected crosstalk generating area. The setup guideline may include 3D option according to at least one of display device manufacturer and product model.

Accordingly, the viewer may set up the 3D options according to the guideline, and thus minimize crosstalk effect on the corresponding content.

FIG. 4 is a view provided to explain the form of table storing therein response speed of the panel, according to an exemplary embodiment.

Referring to FIG. 4, the response speeds of the display panel to the respective pixel values may be stored in advance at the display apparatus. To be specific, the response speed of the display panel in response to the variation in the pixel value may be stored in the table form.

By way of example, if an image has a left-eye image frame with 255/255/255 RGB pixel value, and right-eye image frame with 64/200/64 RGB pixel value, the R pixel value may change from 255 to 64, the G pixel value may change from 255 to 200 and the B pixel value may change from 255 to 64.

In the above example, the response speeds of the panel are 8.1 ms, 8.9 ms, 8.9 ms, and it is possible to detect the crosstalk generating area using these values. That is, it is possible to detect the crosstalk generating area by averaging response speeds according to pixels, and comparing the calculated average response speed with a preset threshold.

If the crosstalk generating area is detected, the specific pixel value having crosstalk may be constructed into table form and provided to the panel manufacturer, content provider, etc.

Figure 5A:
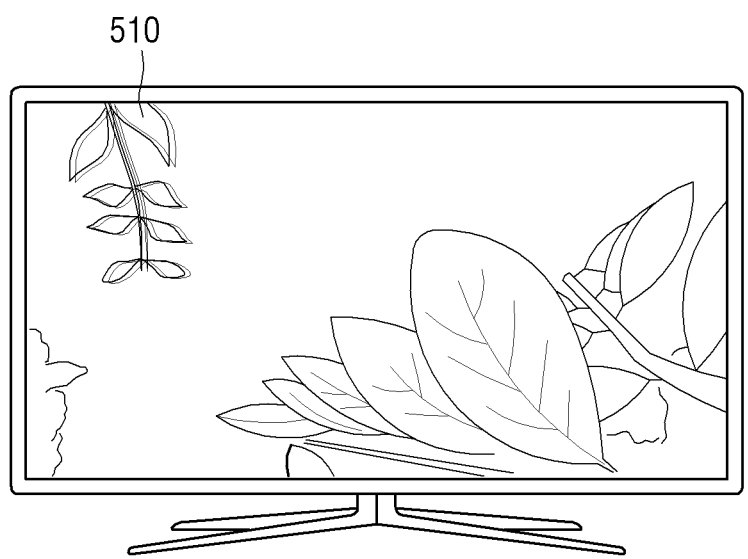
FIGS. 5A and 5B are views provided to explain a method for displaying crosstalk generating area according to an exemplary embodiment.
Figure 5B:
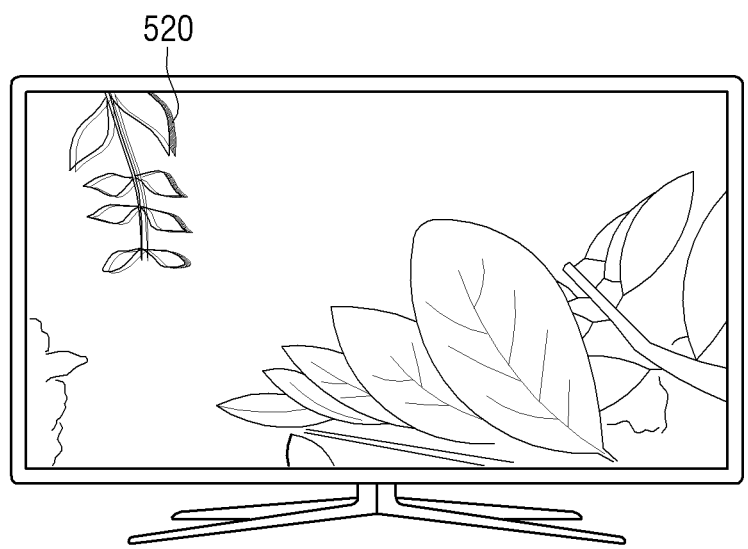

FIGS. 5A and 5B are views provided to explain a method for displaying crosstalk generating area according to an exemplary embodiment.

FIG. 5A illustrates a phenomenon where the crosstalk is generated, according to an exemplary embodiment. Referring to FIG. 5A, if crosstalk phenomenon occurs at a predetermined portion 510 of the displayed area, the crosstalk generating area that causes the phenomenon may be detected and displayed.

FIG. 5B illustrates an example where the crosstalk generating area is distinguishably indicated according to an exemplary embodiment.

Referring to FIG. 5B, it is possible to detect the crosstalk generating area 520 using pixel values of the images to the left/right of the area where the crosstalk phenomenon occurs, and the response speed according to pixel value difference, and indicate the detected area 520 distinguishably from the other image areas.

In one exemplary embodiment, longer response time and shorter response time with reference to a preset threshold time may be indicated in different grayscale from each other.

Figure 6A:
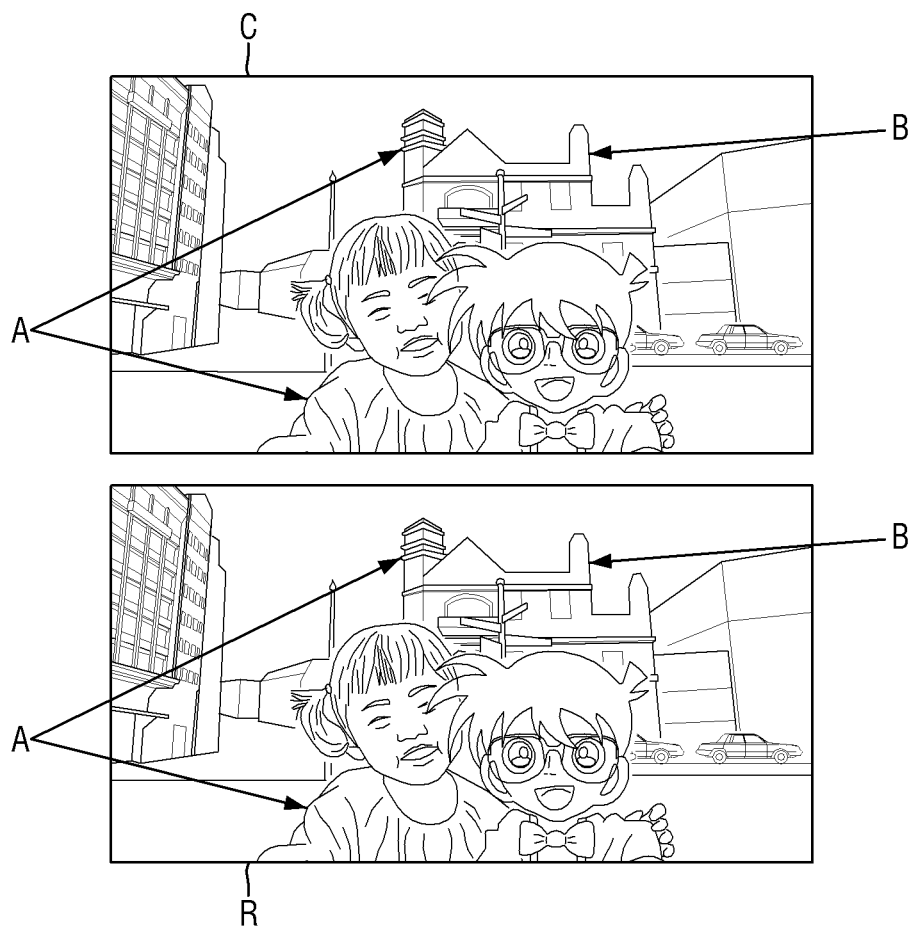
FIGS. 6A to 6C are views provided to explain a method for detecting crosstalk generating area according to an exemplary embodiment.
Figure 6B:
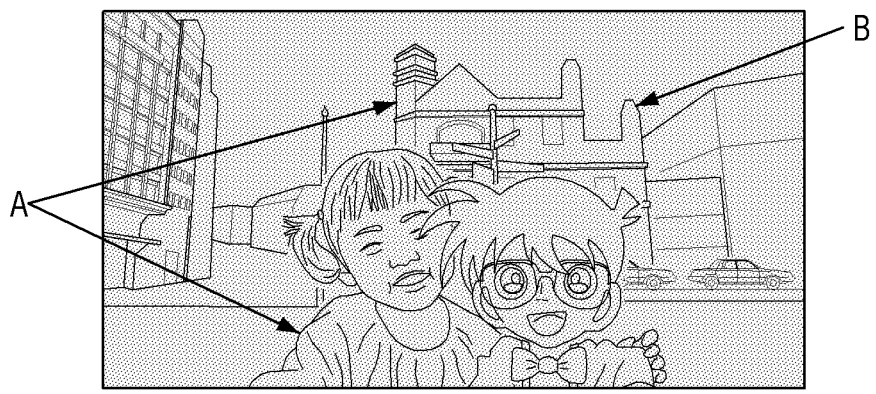
Figure 6C:
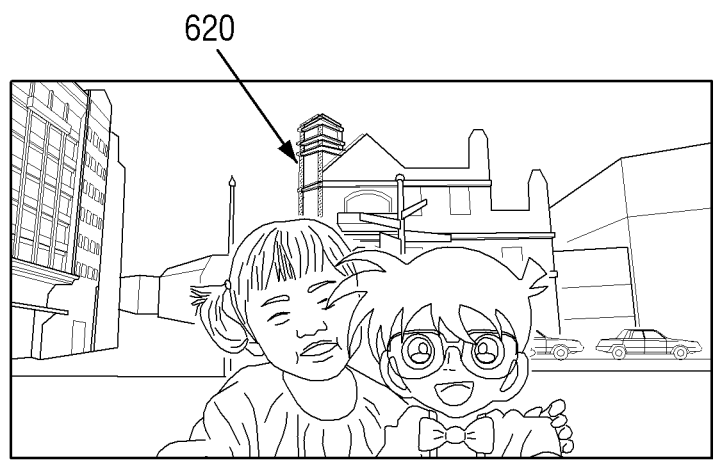

FIGS. 6A to 6C are views provided to explain a method for detecting crosstalk generating area, according to an exemplary embodiment.

Referring to FIG. 6A, difference of respective areas or pixel values is detected from the left-eye and right-eye images separated from the 3D image. The example illustrated in FIG. 6A will be particularly explained below, where the difference of pixel values of areas A and B of the left-eye image is detected.

Referring to FIG. 6B, as a result of detecting pixel value difference, if difference of pixel values is detected between the left-eye image and right-eye image of area A, while no pixel value difference is detected in the left-eye and right-eye images in area B, area A may be determined to be the area possibly having crosstalk.

By way of example, if the left-eye image frame of area A has 255/200/2564 RGB pixel value and the right-eye image frame has 200/200/255 RGB pixel value, area A is detected as having pixel value difference. Further, if the left-eye image frame in area B has 0/200/200 RGB pixel value and the right-eye image frame has 0/200/200 RGB pixel value, area B may be detected as having no pixel value difference.

Then, in area A which is detected as having pixel value difference in left-eye and right-eye images, a response speed of the panel may be detected in accordance with the variation of pixel values in the left-eye and right-eye images. Accordingly, if it is determined that the lower area of area A has faster response speed than the preset threshold, but the upper area of area A has slower response speed than the preset threshold, the upper area 620 of area A may be indicated to be the crosstalk generating area.

Although the area finally confirmed as having crosstalk may be indicated as illustrated in FIG. 6B, this is not limiting. Accordingly, depending on occasions, the area from which pixel value difference is detected may be distinguishably displayed from the rest of area A (FIG. 6A).

Figure 7A:
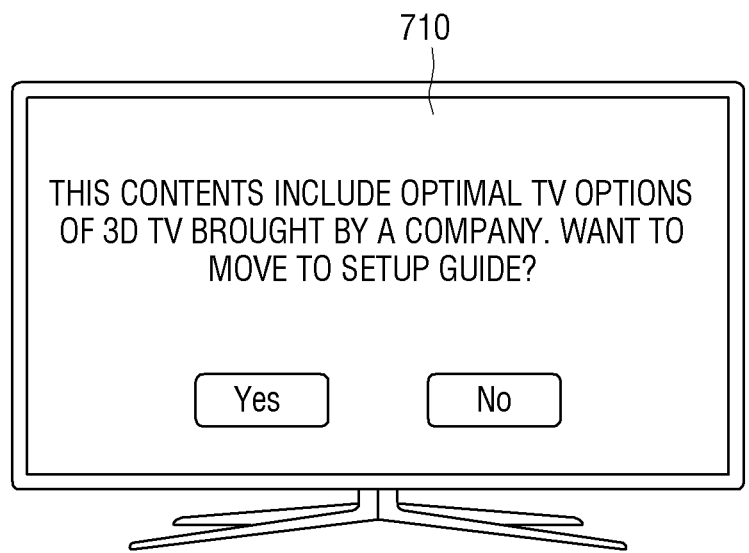
FIGS. 7A and 7B are views illustrating user interface screen according to an exemplary embodiment.
Figure 7B:
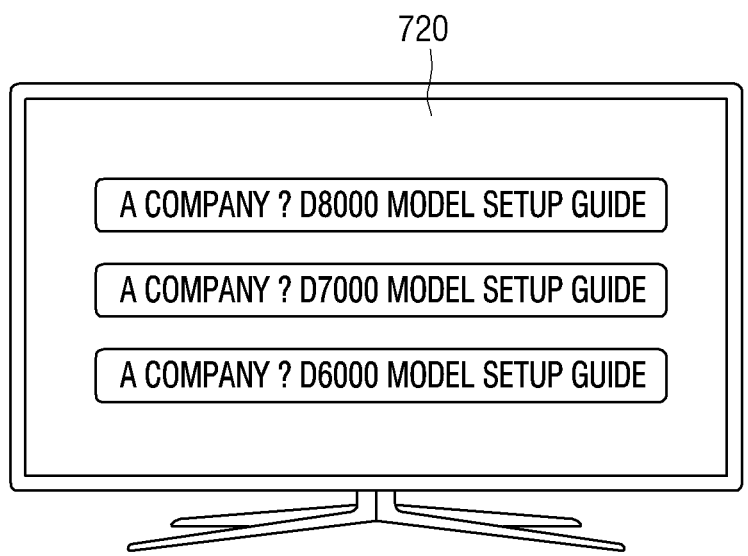

FIGS. 7A and 7B are views illustrating user interface screen according to an exemplary embodiment.

Referring to FIG. 7A, in one exemplary embodiment, if crosstalk generating area with respect to a specific content is detected, the corresponding information may be provided to the viewer to enable the viewer to view the content with optimum viewing condition.

By way of example, content may be simulated through a broadcasting monitor of A company and the cross generating area may be detected. If the cross generating area is detected, 3D view options may be set using the detected information, and guide regarding the corresponding options may be added to the corresponding content and provided. Accordingly, if the content is selected, the user interface screen 710 may be displayed to notify the user that the option setup guide is provided.

Referring to FIG. 7A, if "Yes" is selected on the user interface screen, the setup guide lines for each TV models of A company may be provided so that the viewer selects the model.

Of course, if 3D option setup guidelines for respective manufacturers are added to the content, the user interface screen 720 to enable the viewer to select the manufacturer may also be provided.

Although an example where the viewer watches the content through TV is explained above, this is not limiting. Accordingly, the same exemplary embodiment is applicable to when the viewer watches contents through a DVD player, a Blu-ray Disc player, a smartphone application, a smart TV application, etc.

FIG. 8 is a flowchart provided to explain a control method of a display apparatus according to an exemplary embodiment.

Referring to the control method of the display apparatus illustrated in FIG. 8, at S810, the received image is separated into left-eye and right-eye images and processed. If the received image is a 3D image, the corresponding image may be separated into left-eye and right-eye images, or if the received image is a 2D image, the image may be converted into 3D image and then separated into left-eye and right-eye images.

At S820, the separated left-eye and right-eye images are output alternately.

At S830, difference of pixel values of left-eye and right-eye images is calculated in unit of pixels that constitute the left-eye and right-eye images which are alternately output.

At S840, crosstalk generating area is detected using the calculated pixel value difference and response speed of the display panel with respect to the pre-stored pixel values.

At S850, the crosstalk generating area is indicated distinguishably from the other areas.

In one exemplary embodiment, the crosstalk generating area may be indicated in different forms depending on the degrees of crosstalk as generated.

Further, the operation at S840 to detect the crosstalk generating area may determine an area possibly having crosstalk based on the calculated pixel value difference, and detect the crosstalk generating area by checking response speed in accordance with the variation of pixel values of the left-eye and right-eye images with respect to the area determined as possibly having crosstalk.

Further, a reference value to determine the area possibly having crosstalk may be input, and the operation at S840 to detect the area possibly having crosstalk may detect the area possibly having crosstalk if the calculated pixel value exceeds the input reference value.

Further, the area possibly having crosstalk may be distinguishably indicated from the other areas.

Further, 3D option setup guidelines to minimize the crosstalk effect at the detected crosstalk generating area may be provided.

The 3D option setup guideline may include 3D option setup guide line according to at least one of display device manufacturer and product model.

In various exemplary embodiments, display apparatus with limited panel response time, such as active shutter glass type, passive patterned retarder type, active retarder type may be implemented.

Further, if the display apparatus is implemented as a standard broadcasting monitor, the display apparatus may be designed with the best specifications to suit the uniformity, color or luminance requirements for broadcast content.

Further, in various exemplary embodiments, the calculated information may be inserted into various information medium to be provided to the viewer.

Further, in one exemplary embodiment, a computer readable recording medium including program to execute the control method of the display apparatus may be implemented. The computer readable recording medium may include all types of recording medium to which computer recordable data can be recorded. An example of the computer readable medium may include ROM, RAM, CD-ROM, magnetic tape, floppy disk, optical data storage, or the computer readable recording medium may be distributed over the networked computer system in which computer readable code is stored and executed in distribution manner.

As explained above, according to exemplary embodiments, a content provider may predict the crosstalk generating area in the process of making 3D content, an thus is able to deal with the details. Further, since guidelines are provided, viewers are enabled to minimize the crosstalk effect.

The foregoing embodiments and advantages are merely exemplary and are not to be construed as limiting the inventive concept. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A display apparatus comprising:
an image receiver which receives an image;
an image processor which separates the received image into a left-eye image and a right-eye image and process the left-eye image and the right-eye image;
an image output unit comprising a display panel which displays the left-eye and right-eye images alternately;
a storage which stores response speeds of the display panel according to variations in pixel values of the left-eye image and the right-eye image; and
a controller which calculates a pixel value difference between the left-eye and right-eye images based on a unit of pixels that constitute the left-eye and right-eye images, detects a crosstalk generating area of the left-eye and right-eye images using the calculated pixel value difference and the response speeds of the display panel stored in the storage, and controls so that the detected crosstalk generating area is indicated distinguishably from other areas of the left-eye and right-eye images,
wherein the controller determines an area possibly having crosstalk based on an area in which the calculated pixel value difference with respect to respective pixel unit of the left-eye and right-eye images is greater than a reference value, and
checks the response speeds of the display panel according to a variation of pixel values of the left-eye and right-eye images with respect to the area determined to possibly have the crosstalk and detects the crosstalk generating area.

2. The display apparatus of claim 1, wherein the controller controls so that the crosstalk generating area is displayed in different forms depending on degrees of crosstalk as generated.

3. The display apparatus of claim 1, further comprising a user interface unit which receives the reference value to determine the area possibly having crosstalk.

4. The display apparatus of claim 3, wherein the controller controls so that the area possibly having crosstalk is distinguishably indicated from the other areas.

5. The display apparatus of claim 1, wherein the controller provides a 3D option setup guideline to minimize crosstalk effect at the detected crosstalk generating area.

6. The display apparatus of claim 1, wherein the 3D option setup guideline is a setup guideline regarding 3D option according to at least one of a display apparatus manufacturer and a product model.

7. A control method of a display apparatus, the control method comprising:
separating a received image into a left-eye image and a right-eye image and processing the left-eye and right-eye images;
displaying the left-eye and right-eye images alternately;
calculating a pixel value difference of the left-eye and right-eye images based on a unit of pixels constituting the left-eye and right-eye images;
detecting a crosstalk generating area of the left-eye and right-eye images using the calculated pixel value difference and response speeds of a display panel, the response speeds being pre-stored response speeds according to variations in pixel values of the left-eye image and the right-eye image; and
displaying the detected crosstalk generating area distinguishably from other areas of the left-eye and right-eye images,
wherein the detecting the crosstalk generating area comprises:
determining an area possibly having crosstalk based on an area in which the calculated pixel value difference with respect to respective pixel unit of the left-eye and right-eye images is greater than a reference value; and
checking the response speeds of the display panel according to a variation of pixel values of the left-eye and right-eye images with respect to the area determined to possibly have the crosstalk and detecting the crosstalk generating area.

8. The control method of claim 7, wherein the displaying comprises displaying the crosstalk generating area in different forms according to degrees of crosstalk as generated.

9. The control method of claim 7, further comprising inputting the reference value to determine the area possibly having crosstalk.

10. The control method of claim 9, further comprising indicating the area possibly having crosstalk distinguishably from the other areas.

11. The control method of claim 7, further comprising providing a 3D option setup guideline to minimize crosstalk effect at the detected crosstalk generating area.

12. The control method of claim 11, wherein the 3D option setup guideline is a setup guideline regarding 3D option according to at least one of a display apparatus manufacturer and a product model.

* * * * *